(12) United States Patent
Ah-Pine et al.

(10) Patent No.: US 8,423,549 B2
(45) Date of Patent: Apr. 16, 2013

(54) METHOD FOR STABLE AND LINEAR UNSUPERVISED CLASSIFICATION UPON THE COMMAND ON OBJECTS

(75) Inventors: Julien Ah-Pine, Paris (FR); Hamid Benhadda, Rueil-Malmaison (FR); Julien Lemoine, Bezons (FR)

(73) Assignee: Thales, Neuilly sur Seine (FR)

( * ) Notice: Subject to any disclaimer, the term of this patent is extended or adjusted under 35 U.S.C. 154(b) by 1128 days.

(21) Appl. No.: 12/097,613

(22) PCT Filed: Dec. 14, 2006

(86) PCT No.: PCT/EP2006/069726
§ 371 (c)(1),
(2), (4) Date: Dec. 12, 2008

(87) PCT Pub. No.: WO2007/068741
PCT Pub. Date: Jun. 21, 2007

(65) Prior Publication Data
US 2009/0287723 A1 Nov. 19, 2009

(30) Foreign Application Priority Data
Dec. 16, 2005 (FR) .................................. 05 12844

(51) Int. Cl.
*G06F 7/00* (2006.01)
*G06F 17/00* (2006.01)
(52) U.S. Cl.
USPC ........................................................ 707/737
(58) Field of Classification Search .................. 707/737, 707/748, 752
See application file for complete search history.

(56) References Cited

U.S. PATENT DOCUMENTS
6,976,207 B1 * 12/2005 Rujan et al. .................... 715/234

OTHER PUBLICATIONS

Ah-Pine, J. et al. "Un nouvel outil de classification non supervisee de documents pour la decouverte de connaissances et la detection de signaux faibles: RARES Text." Journees Sur Les Systemes D'Information Elaboree, [Online], Jun. 13, 2005, pp. 1-15, XP002407399, Ile Rousse, France, Retrieved from the Internet: URL:http://isdm.univ-tln.fr/pdf/isdm22/isdm22_ahpine.pdf> [retrieved on Nov. 14, 2006].
Benhadda, H. et al. "Introudction a la similarite regularisee en analyse relationnelle." Revue De Statistique Apploquee, [Online] vol. 46, No. 1, 1998, pp. 45-69, XP002407400, Paris, France, Retrieved from the Internet: URL:http://archive.numdam.org/ARCHIVE/RSA/RSA_1998_46_1_45_0/RSA_1998_46_1_45_0.pdf> [retrieved on Nov. 14, 2006].

(Continued)

*Primary Examiner* — Usmaan Saeed
*Assistant Examiner* — Paul Kim
(74) *Attorney, Agent, or Firm* — Lowe Hauptman Ham & Berner, LLP (57) ABSTRACT

A method of linear unsupervised classification allowing a database composed of objects and of descriptors to be structured, which is stable on the order of the objects, comprises an initial step for transformation of the qualitative, quantitative or textual data into presence-absence binary data. A structural threshold $\alpha_s$ function is determined of the $n^2$ agreements between the objects to be classified with the structural threshold defining an optimization criterion adapted to the data. The descriptors are used as structuring and construction generators of a partition or set of classes. A class generated by a descriptor and a partition (40, 41, 42) progressively merged. For an optimization criterion involving a function $f(C_{ii}, C_{i'i'}) = \mathrm{Min}(C_{ii}, C_{i'i'})$, sums of Minimum functions are linearized.

7 Claims, 8 Drawing Sheets

OTHER PUBLICATIONS

Erlich, Z. et al. "Data Mining by Means of Binary Representation: A Model for Similarity and Clustering." Information Systems Frontiers, [Online] vol. 4, No. 2, Jul. 2002, pp. 187-197, XP002407401, Netherlands, ISSN: 1387-3326, Retrieved from the Internet: URL: http://www.springerlink.com/content/myjcjjlwcu0qa3p6/fulltext.pdf> [retrieved on Nov. 14, 2006].

Saporta, G. (1990), "Probabilites, Analyse de donnees et Statistique", Technip.

Lebart et al. (1995), "Multidimensional Exploratory Estatistics", Dunod.

Hartigan, J. (1975), "Clustering Algorithms", John Wiley and Sons, New York, NY, US.

P. Michaud and J. F. Marcotorchino, "Optimization Models in Rational Data Analysis", Mathematiques et Sciences Humaines No. 67, 1979, pp. 7-38:2.

J. F. Marcotorchino and P. Michaud, "Aggregation of the Similarities in Automatic Classification", Revue def statistique appliquee, vol. 30, No. 2, 1981, pp. 21-44.

* cited by examiner

METHOD FOR STABLE AND LINEAR UNSUPERVISED CLASSIFICATION UPON THE COMMAND ON OBJECTS

CROSS-REFERENCE TO RELATED APPLICATIONS

The present Application is based on International Application No. PCT/EP2006/069726, filed on Dec. 14, 2006, which in turn corresponds to French Application No. 0512844, filed on Dec. 16, 2005, and priority is hereby claimed under 35 USC §119 based on these applications. Each of these applications are hereby incorporated by reference in their entirety into the present application.

FIELD OF THE INVENTION

The invention relates to a linear unsupervised method of classification stable on the order of objects.

It more generally relates to automatic classification techniques known under the term "clustering".

It is notably used in the fields of "Data Mining" and "Text Mining" for "knowledge discovery", with no prior assumptions, in large databases. This data can be of the structured type when dealing with behavioral or demographics data, for example, or of the unstructured type when dealing with textual data.

BACKGROUND OF THE INVENTION

Starting from a database formed from a set (or population) of n objects described by a set of m descriptors (or variables), the automatic classification consists in structuring these objects in the form of very homogeneous classes (or groups). This homogeneity means that two objects of the same class must be more similar to (or resemble) one another than two objects belonging to two different classes.

The formation of these classes will allow groups of objects with similar profiles or themes to be easily detected depending on whether the data is of the structured or unstructured type.

This problem has too many permutations and combinations to be solved by an exact method. For this reason, heuristic algorithms that are less costly in terms of processing time and machine resources have been generated in order to find approximate solutions to it.

Some of these heuristic algorithms offer solutions by arbitrarily fixing the number of classes, whereas others propose a hierarchy having partitions with a variable number of classes.

For example, the following heuristic algorithms may be mentioned:

The methods of the "mobile centers" type, such as "k-means", dynamic clustering, etc. . . . .

The methods of hierarchical classification (increasing or decreasing)

The methods of the "first leader" type, etc.

Examples for various unsupervised methods of classification are given in the following references: 1) Saporta G. (1990), Probabilités, Analyse de données et Statistique, Technip: 2) Lebart and al (1995), Multidimensional exploratory statistics, Dunod: 3) Hartigan, J. (1975), Clustering Algorithms, John Wiley and Sons, New York, N.Y., US.

The methods of the "mobile centers" and hierarchical classification type arbitrarily fix a number of classes. On the other hand, the methods of the "first leader" type require a similarity threshold to be fixed and are dependent on the order in which the objects are taken into account. Indeed, they may lead to completely different results depending on the order in which the objects are arranged. Nevertheless, they do allow large quantities of data to be processed within reasonable times. However, in order to achieve this performance, these methods require the maximum number of classes to be fixed at a very small number with respect to the number of objects.

Amongst the major problems encountered in dealing with the issue of automatic classification may be mentioned:

the determination of the number of classes underlying the population in question, the performance in terms of processing times depending on the volume sizes to be processed and in terms of quality of the homogeneity of the classes obtained, the capability of interpretation of the results obtained: definition of statistical indicators for the measurement of the homogeneity of the classes together with the discriminating power of the descriptors participating in the formation of these classes.

The idea of the present invention rests notably on the theory of relational analysis. As a reminder, this theory, such as described in one of the following references: 1) P. Michaud and J F Marcotorchino, "Optimization models in rational data analysis", Mathématiques et Sciences Humaines n° 67, 1979, p 7-38: 2: J F Marcotorchino and P Michaud, "Aggregation of the similarities in automatic classification", Revue def statistique appliquée, Vol 30, n° 2, 1981, provides a solution to the problems associated with the fixing of the number of classes and of the interpretation of the result obtained. However, the underlying theoretical model is extremely costly in terms of machine resources whenever the number of objects exceeds 100. The invention uses a heuristic approach of this theory which allows the theoretical result on large databases to be very closely approximated.

SUMMARY OF THE INVENTION

The invention relates to a method of linear unsupervised classification allowing a database composed of objects and of descriptors to be structured, which is stable on the order of the objects, comprising an initial step for transformation of the qualitative, quantitative or textual data into presence-absence binary data, characterized in that it comprises at least the following steps:

a) determine a structural threshold $\alpha_s$ function of the $n^2$ agreements between the objects to be classified, the structural threshold defining an optimization criterion adapted to the data, b) use the descriptors as structuring and construction generators of a partition P or set of classes, c) progressively merge a class generated by a descriptor and a partition (40, 41, 42), d) for an optimization criterion involving a function $f(C_{ii'}, C_{i'i'})=\text{Min}(C_{ii'},C_{i'i'})$, linearize sums of Minimum functions.

The method can comprise a step where the classes of the partition are regrouped amongst themselves.

The merge step c) comprises, for example, a step where, based on two intersecting classes, the best operation (in terms of the optimization of the criterion) is determined from amongst the following 4:

"Breaking" of the first class and formation of two classes;

"Breaking" of the second class and formation of two classes;

"Breaking" of the two classes in order to form three classes;

Joining of the two intersecting classes in order to form one single class.

The regrouping of the classes of a partition is for example carried out over several hierarchical levels and comprises the following steps:
- decrease at each level the value of the structural threshold in such a manner that the weakly negative contributions can become positive,
- maximize links between the classes formed where the links are determined by using the contribution from a pair of objects $$Lien(C_q, C_{q'}) = \sum_{i \in C_q} \sum_{i' \in C_{q'}} Contrib_{ii'} = \sum_{i \in C_q} \sum_{i' \in C_{q'}} C_{ii'} - \alpha' \times f(C_{ii}, C_{i'i'})$$

with $\alpha'$ the new value of $\alpha$
combine two classes whose link is positive, and reiterate this process over all the levels.

The invention also relates to a device for linear unsupervised classification allowing a database composed of objects and of descriptors to be structured, which is stable on the order of the objects, comprising an initial step for transformation of the qualitative, quantitative or textual data into presence-absence binary data, characterized in that it comprises at least the following elements: a computer comprising a memory, a database and a processor designed to implement the steps of the method exhibiting one of the aforementioned features.

The invention notably has the following advantages:
- the possibility of automatically detecting the number of classes during the classification,
- the possibility of processing large quantities of data in reasonable amounts of time,
- its independence with regard to the order of the objects in the database. It is naturally stable with regard to the order of processing of the objects,
- the method allows indicators measuring the quality of the results obtained to be defined and calculated very rapidly (linear complexity),
- the method is stable with regard to the duplication of the objects. In other words, if the database is replicated several times, the same initial solution is recovered with the objects duplicated within the same class.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1, a block diagram corresponding to a generic system of a system supporting the method according to the invention, FIG. 2, a block flow diagram describing the general operation of the processing chain in the field of data mining applied to a corpus of documents or to a numerical database, FIG. 3, a block flow diagram that shows the steps in the pre-processing phase which is carried out upstream of the automatic classification process, FIG. 4, a block flow diagram that shows the ordering of the steps forming the method of this invention, FIG. 5, a block flow diagram that details the various operations carried out during the processing 41 in FIG. 4, FIG. 6, the basic operation that consists in determining the optimum local partition (into one, two or three classes) coming from two intersecting classes, FIG. 7, the quantities evaluated during the basic operation described in FIG. 6, FIG. 8, a block flow diagram that shows the steps in the process of hierarchical organization of the classes.

DESCRIPTION OF THE PREFERRED EMBODIMENTS

Figure 1:
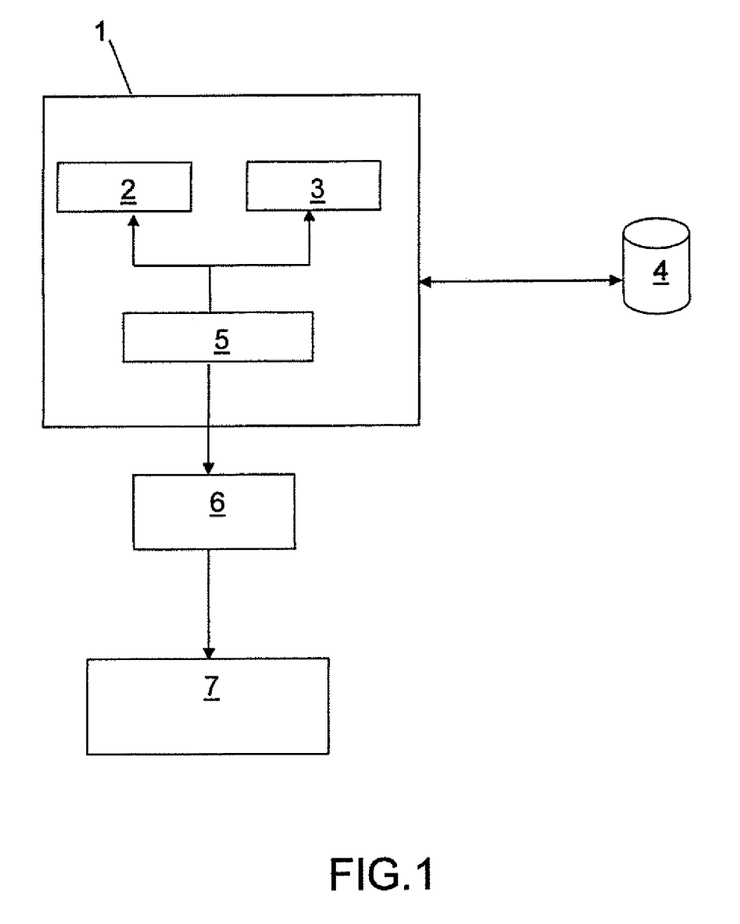

FIG. 1 presents a non-limiting illustration of an example of application of the method according to the invention, allowing various actions, which are to be implemented based on the classification results, to be generated automatically.

The system on which the method operates comprises, for example, a computer 1 comprising a memory 2 and a processor 3 associated with the process of classification 5. The computer 1 is in communication with a database 4. The result of classification, for example, takes the form of a set of classes stored in a suitable device 6. The device 6 is, for example, in communication with an email exchange server 7 for example. The server is equipped with suitable processing means known to those skilled in the art for processing the class information received and potentially triggering mechanisms for sending messages to the people in the classes in question.

Any device enabling actions to be undertaken and/or controlled as a function of the results of the classification may be used.

The description that follows is presented by way of illustration within a general context of executable instructions in a computer program, such as program modules run on a computer or any other calculation device. The invention may be implemented on any kind of computer, PDA, etc.

Figure 2:
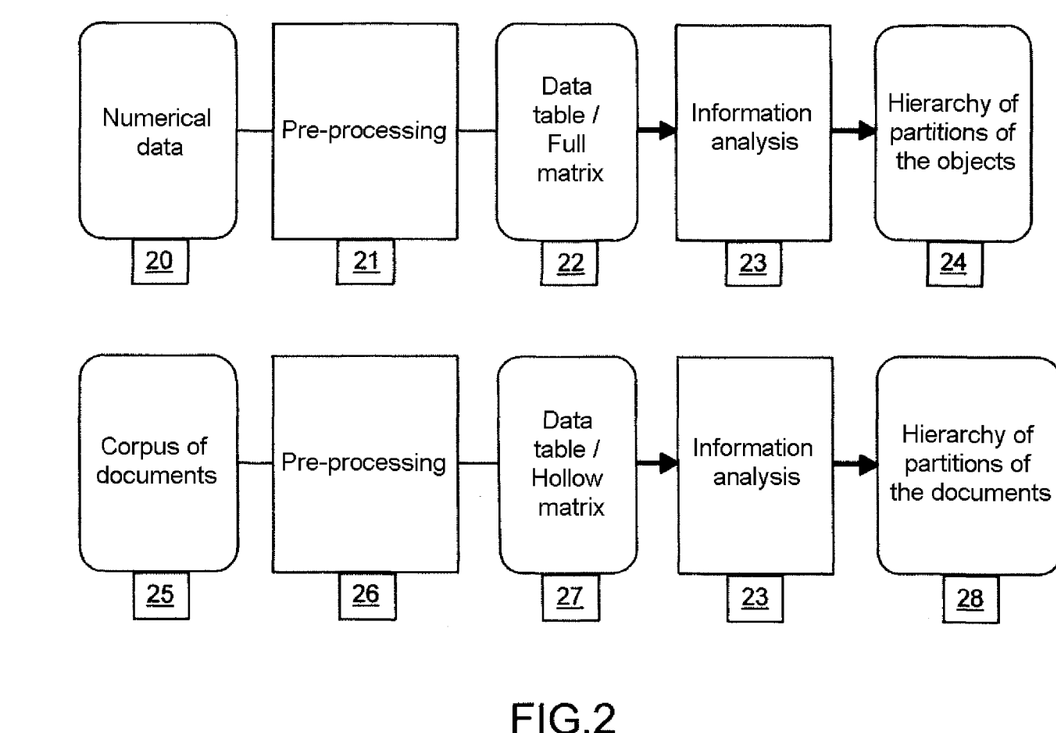

In FIG. 2, the starting point can be either any given database (set of individuals described by a set of numerical variables), or any given corpus of documents. These two types of data are respectively represented by the rounded blocks 20 and 25.

In the case of numerical data, there may be an optional pre-processing phase 21 which consists of conventional statistical processing operations such as the centering or the reduction of the data or else transformations, etc. These pre-processing operations lead to the data table 22. It is this table that constitutes the source for the information analysis processes 23.

With regard to a corpus of documents, in the course of a pre-processing phase 26, each text is transformed into a vector whose dimensions correspond to descriptors obtained by a linguistic process which can be a morpho-syntactic analysis, an extraction of concepts, an extraction of co-occurrences, linguistic and semantic processing operations, etc. A presence-absence (binary) or frequency matrix 27 is obtained which constitutes the source for the processing operations represented by the block 23.

The block 23 notably corresponds to the data processing and analysis phase. These processing operations can be of several types (supervised classification, unsupervised classification, statistical 'scoring', regression, etc.). The scope of the invention relates to unsupervised classification of data, also known as automatic classification or 'clustering'. The invention notably relates to an unsupervised classification process whose result is, for example, a hierarchy of partitions of the objects 24 or of the documents 28 depending on the initial type of data.

Figure 3:
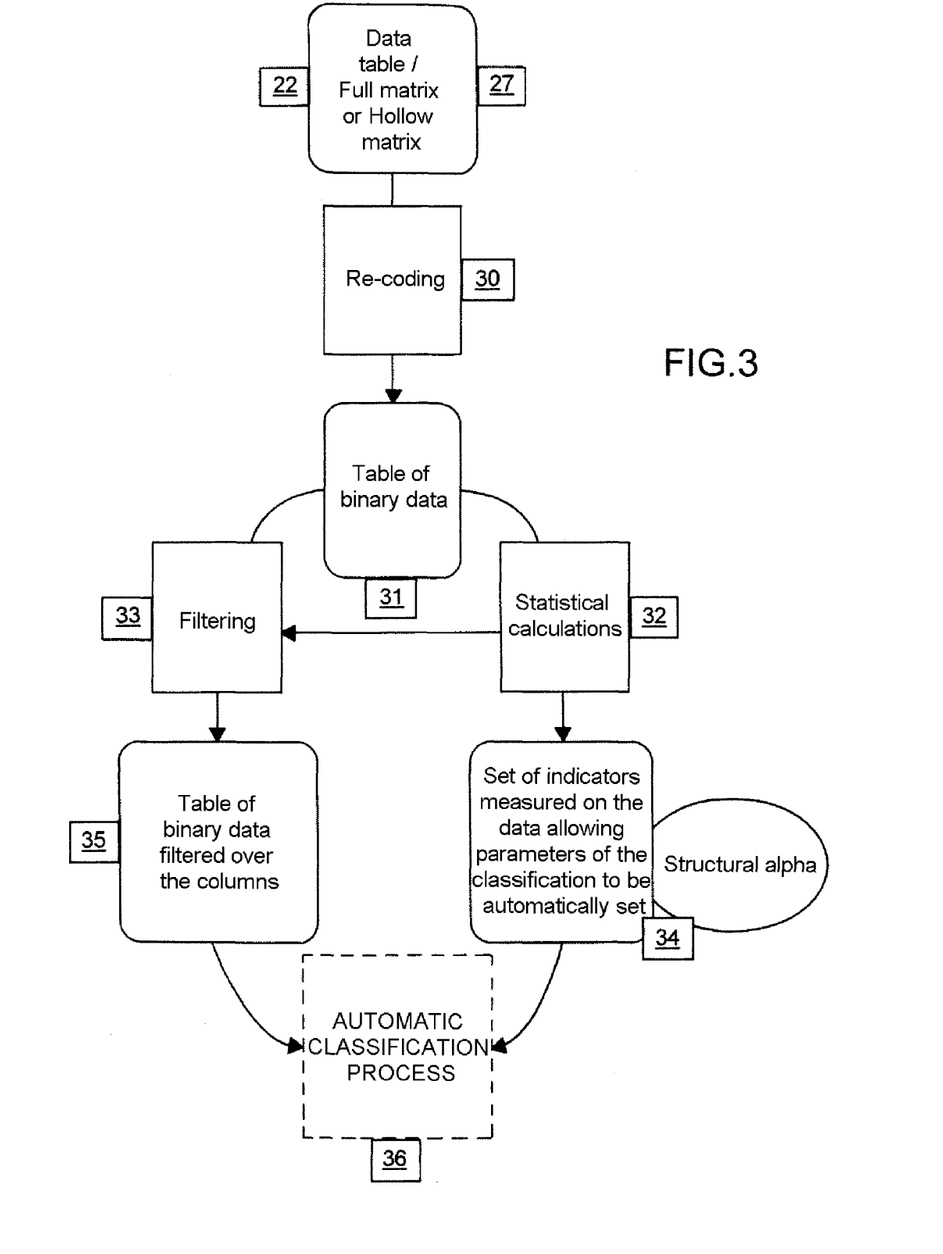

The input data in FIG. 3 takes the form of a table T, 22 or 27, respectively denoting the cases of numerical data and the case of a corpus of documents, crossing the set I, composed of n objects $O_1, O_2, \ldots, O_n$ (individuals or documents), and the set V composed of m variables (or descriptors), $V^1, V^2, \ldots, V^m$ measured on I.

$$I = \{O_1, O_2, \ldots, O_n\}$$

$$V = \{V^1, V^2, \ldots, V^m\}$$

The table T has as its general term $t_{ik}$ which represents the value taken by the variable $V^k$ on the object $O_i$ and takes the following form:

$$T = \begin{pmatrix} t_{11} & \ldots & t_{1k} & \ldots & t_{1m} \\ \vdots & \ldots & \vdots & \ldots & \vdots \\ t_{i1} & \ldots & t_{ik} & \ldots & t_{im} \\ \vdots & \ldots & \vdots & \ldots & \vdots \\ t_{n1} & \ldots & t_{nk} & \ldots & t_{nm} \end{pmatrix}$$

The general term $t_{ik}$, of the input data, represents:
- the modality of the variable k taken by the object i in the case of a qualitative variable,
- the value of the variable k taken by the object i in the case of a quantitative variable,
- the presence or the absence of the lexical unit k in the document i, in the case of textual data.

In the case of qualitative and quantitative data, the method applies re-coding operations 30, described hereinafter, to this table, for example the discretization of the quantitative variables or the re-coding of the qualitative variables into presence/absence descriptors. The qualitative and quantitative variables are transformed into binary variables that will form a presence-absence table K.

In the case of the qualitative variables, the transformation consists, for example, in re-coding of the modalities into presence-absence descriptor vectors.

For quantitative variables, the discretizations consist in transforming the quantitative variables into qualitative variables where each modality corresponds to an interval. For example, let the quantitative variable "size" be expressed in cm and measured on a set of individuals. Assuming that, in the population in question, the size of the individuals composing it is in the range between 140 cm and 210 cm, one possible discretization would be to divide up the variable into the three following intervals [140,160[: [160,180[: [180,210]. These three intervals then respectively correspond to the three following modalities: small, medium and large. Consequently, an individual who has the size 175 cm for example, after discretization, will have the modality medium.

The table K, 31, with general term $k_{ij}$ obtained after these transformations will take the following form:

$$K = \begin{pmatrix} k_{11} & \ldots & k_{1j} & \ldots & k_{1p} \\ \vdots & \ldots & \vdots & \ldots & \vdots \\ k_{i1} & \ldots & k_{ij} & \ldots & k_{ip} \\ \vdots & \ldots & \vdots & \ldots & \vdots \\ k_{n1} & \ldots & k_{nj} & \ldots & k_{np} \end{pmatrix}$$

Its general term $k_{ij}$ can have two meanings depending on whether the variables are initially qualitative variables or quantitative variables:

In the case of a qualitative variable, $k_{ij}$ has the following definition:

$$k_{ij} = \begin{cases} 1 & \text{if the object } i \text{ has the modality } j \\ 0 & \text{otherwise} \end{cases}$$

In the case of a quantitative variable, $k_{ij}$ has the following definition:

$$k_{ij} = \begin{cases} 1 & \text{if the object } i \text{ belongs to the segment } j \\ 0 & \text{otherwise} \end{cases}$$

In the case of the textual data, there is no re-coding step since, after the pre-processing step, 26, a presence-absence binary table is already obtained K whose general term $k_{ij}$ has the meaning:

$$k_{ij} = \begin{cases} 1 & \text{if the document } i \text{ has the lexical unit } j \\ 0 & \text{otherwise} \end{cases}$$

Each variable of the table T, whether it be qualitative or quantitative, will generate several presence-absence descriptor vectors. Indeed, the tables T and K have different dimensions.

The variable "SPC" (Socio-Professional Category) is considered and it is assumed that there are four individuals (I1, I2, I3, I4) with four possible modalities of the variable SPC being: management, manual worker, professionals. It is furthermore assumed that these four individuals have the following modalities:

| Individuals | SPC |
| --- | --- |
| I1 | management |
| I2 | management |
| I3 | manual worker |
| I4 | professionals |

After re-coding of the modalities of the qualitative variable SPC, the following result is obtained:

| Individuals | SPC | | |
| --- | --- | --- | --- |
| | management | manual worker | professionals |
| I1 | 1 | 0 | 0 |
| I2 | 1 | 0 | 0 |
| I3 | 0 | 1 | 0 |
| I4 | 0 | 0 | 1 |

Each modality of the variable in question therefore becomes a presence-absence descriptor. Consequently, the table of the transformed data K will have dimensions (n×p) with p>m where m is the variable number in the set V.

Starting from the table K, 31, statistics calculations, 32 (means, standard deviations, discrimination coefficients, etc.), are carried out that notably allow, on the one hand, the filtering parameters of the descriptors, 33 (elimination of the poorly discriminating descriptors), to be set and, on the other hand, an indicator referred to as structural threshold, 34, to be calculated that removes the necessity for setting parameters for the classification process (neither the number of classes nor the maximum number of classes are fixed). The indicator is described in detail hereinbelow.

The filtering allows the descriptors that are poorly discriminating to be eliminated. The elimination of the descriptors will be different depending on their type. In the case of numerical data, a relevance indicator of the descriptor is used as the basis.

In the case of the documents, the frequency of occurrence of a descriptor within the set of the corpus or any other discrimination measurement indicator such as the entropy, etc., and those that appear not to be very discriminating are eliminated. The filtering step results in a new, reduced binary table, 35, that contains a limited number of columns. It is this new table that is used as input data for the automatic classification process described by the block 36 and detailed in FIGS. 4 and 5.

Structural Threshold and Criterion Adapted to the Data

The method according to the invention uses a structural threshold or indicator whose function is notably to define an optimization criterion adapted to the data.

In order to better understand its role, rational analysis theory is recalled which is based on the maximization of the simplified Condorcet criterion as follows:

$$C(X) = \sum_{i=1}^{n} \sum_{i'=1}^{n} \left[ C_{ii'} - \frac{1}{2} \times f(C_{ii}, C_{i'i'}) \right] X_{ii'}$$

where $C_{ii'}$ represents the degree of similarity between the two objects i and i'. For example:

$$C_{ii'} = <\vec{O}_i, \vec{O}_i> = \sum_{j=1}^{p} k_{ij} k_{i'j}$$

and $\vec{O}_i$ represents the profile of the object $O_i$ given by the $i^{th}$ row of the table K:

$$\vec{O}_i = (k_{i1}, k_{i2}, \ldots, k_{ij}, \ldots, k_{ip})$$

and where $f(C_{ii}, C_{i'i'})$ is a function of the maximum specific agreements of the individuals i and i'.
For example:

$$f(C_{ii}, C_{i'i'}) = \frac{1}{2}(C_{ii} + C_{i'i'})$$

$$f(C_{ii}, C_{i'i'}) = \text{Min}(C_{ii}, +C_{i'i'})$$

etc. . . .
$X_{ii'}$ is furthermore given by:

$$X_{ii'} = \begin{cases} 1 & \text{if the objects } i \text{ and } i' \text{ are in the same class} \\ 0 & \text{otherwise} \end{cases}$$

The method according to the invention is of linear complexity given that the formulae of the $$\sum_i \sum_{i'} C_{ii'} \text{ and } \sum_i \sum_{i'} f(C_{ii}, C_{i'i'})$$

type may be calculated linearly. The functions aforementioned as examples are all linearizable. Indeed, the measure of similarity $C_{ii'}$ used is a scalar product having known linearity properties, the function $$f(C_{ii}, C_{i'i'}) = \frac{1}{2}(C_{ii} + C_{i'i'})$$

is linear, whereas the function $f(C_{ii}, C_{i'i'}) = \text{Min}(C_{ii}, C_{i'i'})$ is not linear. However, calculations of the $$\sum_i \sum_{i'} \text{Min}(C_{ii}, C_{i'i'})$$

type may be linearized.

By way of illustration, the invention describes the particular case $f(C_{ii}, C_{i'i'}) = \text{Min}(C_{ii}, C_{i'i'})$ especially adapted to databases containing a large number of missing data and the procedures that allow calculations of the $$\sum_i \sum_{i'} \text{Min}(C_{ii}, C_{i'i'})$$

type to be calculated with a linear complexity.

The method according to the invention implements for example the following criterion:

$$C^{\alpha}(X) = \sum_{i=1}^{n} \sum_{i'=1}^{n} [C_{ii'} - \alpha \times f(C_{ii}, C_{i'i'})] X_{ii'}$$

$$= \sum_{i=1}^{n} \sum_{i'=1}^{n} \text{Contrib}_{ii'} X_{ii'}$$

where $\alpha$ is a threshold and the quantity $\text{Contrib}_{ii'}$ the unitary contribution of the two objects i and i' to the criterion $C^{\alpha}(X)$.

According to the invention, the structural threshold parameter $\alpha_s$ is calculated automatically. This is an indicator that is a function of the $n^2$ agreements between the objects to be classified:

$$\alpha_s = g(\{C_{ii'}\}_{i,i'=1,\ldots,n})$$

As an example, its formulation when it represents the ratio of the arithmetical mean of the agreements between all the objects over the arithmetical mean of their maximum agreements:

$$\alpha_s = \frac{\frac{1}{n^2} \times \sum_{i=1}^{n} \sum_{i'=1}^{n} C_{ii'}}{\frac{1}{n^2} \times \sum_{i=1}^{n} \sum_{i'=1}^{n} f(C_{ii}, C_{i'i'})}$$

This formula is linearizable under the same conditions as those previously mentioned.

The criterion $C^{\alpha_s}(X)$ used in the invention consists, for example, in comparing the agreements between any two objects with the product of the threshold $\alpha_s$ and their maximum agreement (which represents a percentage of the maximum agreement).

Thus, two objects will automatically be in the same class whenever their similarity is higher than or equal to the calculated percentage of maximum agreement (positive contribution).

Automatic Classification Process of the Invention

Figure 4:
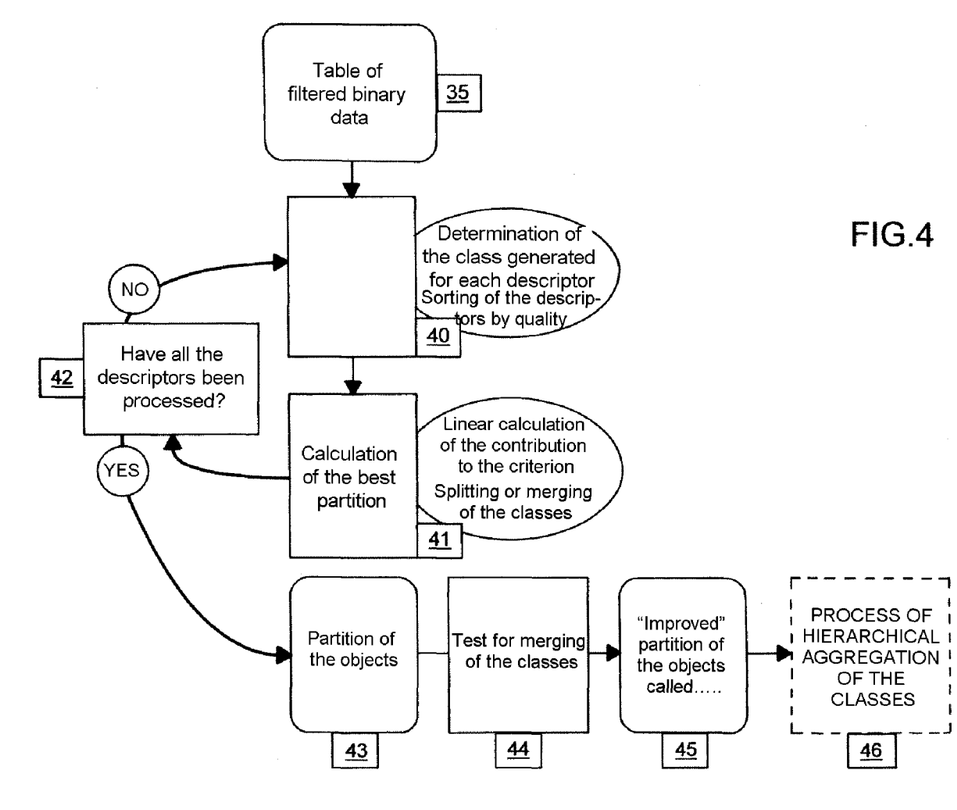

The classification process 36 is described in detail in FIG. 4. The starting point is the table of binary data 35 whose descriptors have been filtered.

The first step of the classification process which consists in sorting the descriptors, 40, relies on a measurement of the contribution of each descriptor to the criterion (quality of a descriptor). For example, the descriptors are used as structuring "generators" for the population of the objects to be classified. A descriptor is represented by a column vector of 1 and 0 (presence-absence). A class is associated with this descriptor that is composed of the objects that take the value of 1. For each class of objects $C_q$, its level of contribution Contrib($C_q$) to the global criterion can then be calculated:

$$\text{Contrib}(C_q) = \sum_{i \in C_q} \sum_{i' \in C_q} \text{Contrib}_{ii'} \qquad [1]$$

$$= \sum_{i \in C_q} \sum_{i' \in C_q} C_{ii'} - \alpha \times \sum_{i \in C_q} \sum_{i' \in C_q} f(C_{ii}, C_{i'i'})$$

The evaluation of the contribution of a class is of polynomial complexity. Indeed, if it is assumed that all the objects form a single class, $n^2$ unitary contributions would then need to be calculated in order to determine the value of the criterion.

In the case where $C_{ii'}$ is a scalar product, the first part of the formula on the right, $$\sum_{i \in C_q} \sum_{i' \in C_q} C_{ii'},$$

may be simplified in the following manner:

$$\sum_{i \in C_q} \sum_{i' \in C_q} C_{ii'} = \langle \vec{R}^q, \vec{R}^q \rangle$$

where $\vec{R}^q = (r_1^q, r_2^q, \ldots, r_p^q)$ is called representative of the class $C_q$ whose terms are given by the column sum of each modality of the table K for the objects of the class:

$$r_j^q = \sum_{i \in C_q} k_{il}.$$

Each value $r_j^q$, $j=1, \ldots, p$, represents the number of objects of the class $C_q$ that possess the modality 1.
In the case where $f(C_{ii}, C_{i'i'}) = \text{Min}(C_{ii}, C_{i'i'})$, the second part of the formula on the right of the equation [1] is equal to $$\sum_{i \in C_q} \sum_{i' \in C_q} \text{Min}(C_{ii}, C_{i'i'}).$$

The procedure allowing this quantity to be calculated with a linear complexity is given hereinbelow.

---

Procedure MinCC (Class C)
    Requires: CardC > 0
    Requires: Sorted list of individuals for the class C -continued     Integer: result = 0
    Integer: j = next element of C
    Integer: i = 0
    While the class C has not ended, Do
        result = result + [( CardC − i ) × 2 − 1] × $C_{jj}$
        j = next element of C
        i = i + 1
    End While

---

For each descriptor q, the value of the contribution of the class generated by the latter or else a measurement of the quality of the descriptor with respect to the criterion is thus obtained. These contributions are then sorted, for example by decreasing order, so as to obtain an order for the descriptors to be taken into account. The choice of this order has very little influence on the quality of the result (there may be a few minimal local differences). However, taking the classes generated by the descriptors of best contributions first, allows a stable solution to be obtained more quickly and hence the process of calculation of the best partition 41, coming from the intersection between the current partition and that generated by a descriptor, to be accelerated.

This process 41 notably consists in progressively "merging" 42, a class generated by a descriptor 40, and a current partition (composed of several classes). This "merging" operation consists in determining, starting from two intersecting classes, the best operation (in terms of the criterion) from amongst the following 4:

"Breaking" of the first class and formation of two classes;
"Breaking" of the second class and formation of two classes;
"Breaking" of the two classes in order to form three classes:
Joining of the two intersecting classes in order to form one single class.

Figure 6:
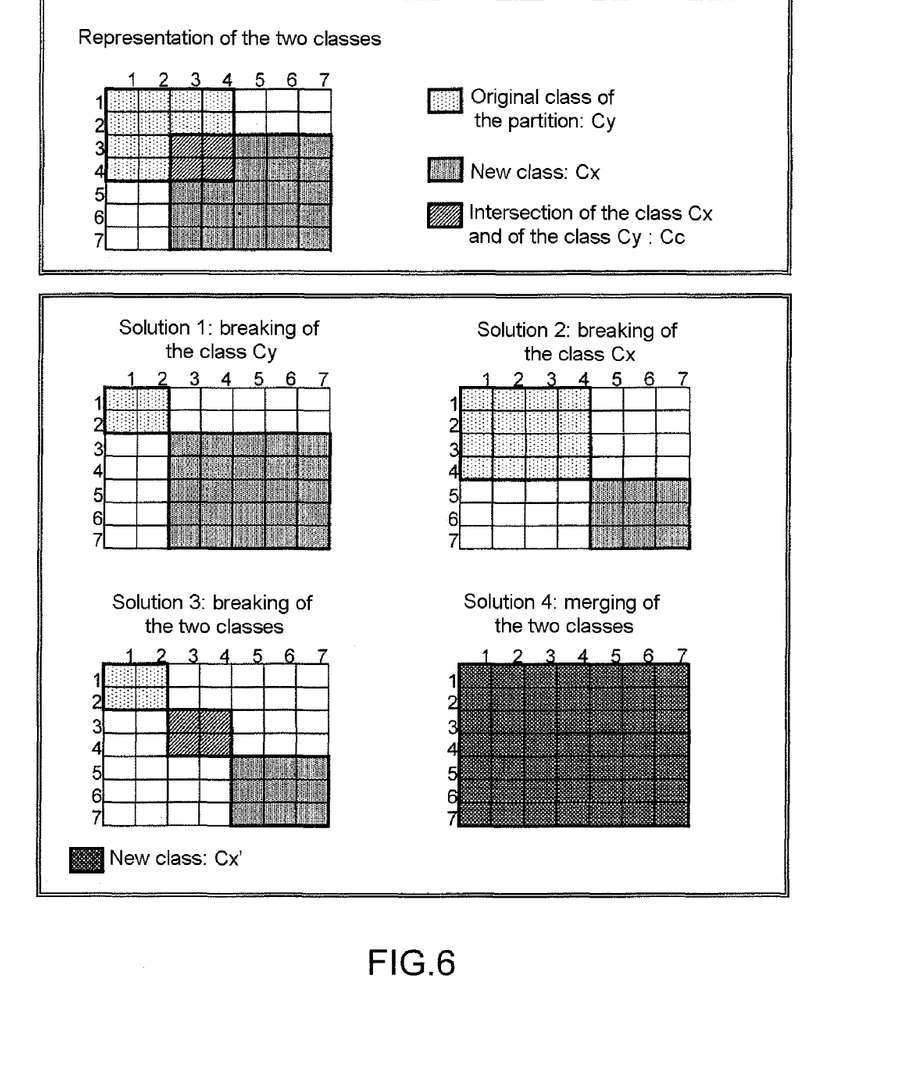
Figure 7:
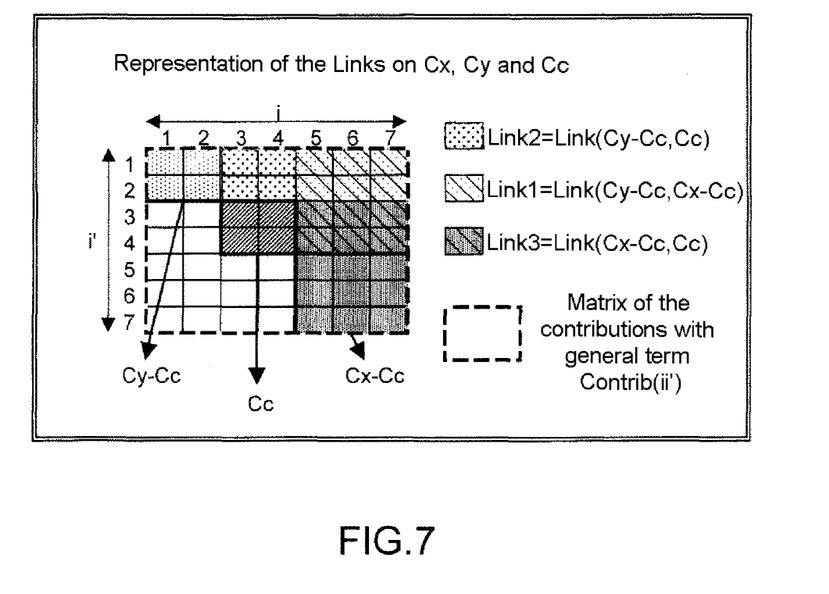

These operations are illustrated in FIG. 6 and the calculations allowing the best operation to be decided in FIG. 7.

This process amounts to constructing step by step a partition that locally and progressively optimizes the global criterion.

Once all the descriptors have been used, the partition obtained $P_0$ is considered as being a first finalized partition of the objects 43.

During the "merging" phase (40, 41, 42) of the classes, it is only attempted to "merge" the classes that possess intersections. The object of the processing operation 44 is to merge, in other words to combine, classes that do not have any intersection if this operation allows the criterion to be optimized (test for merging together of the classes of the partition obtained). This leads to a modified partition 45, a partition of level 1, which constitutes the final partition of the classification process.

Figure 8:
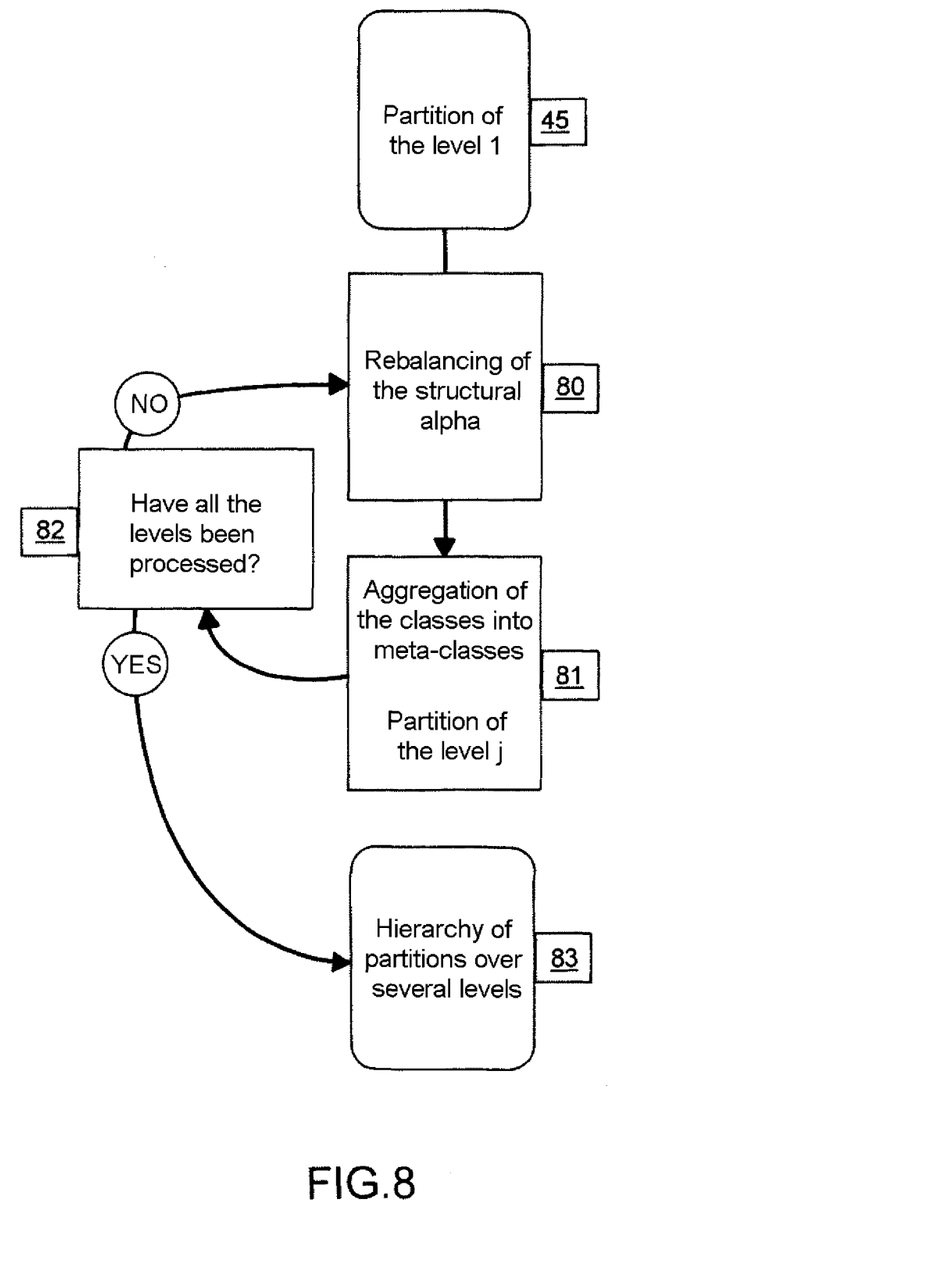

This partition 45 forms the input for the process of aggregation of the classes, 46, which is described in FIG. 8.

Figure 5:
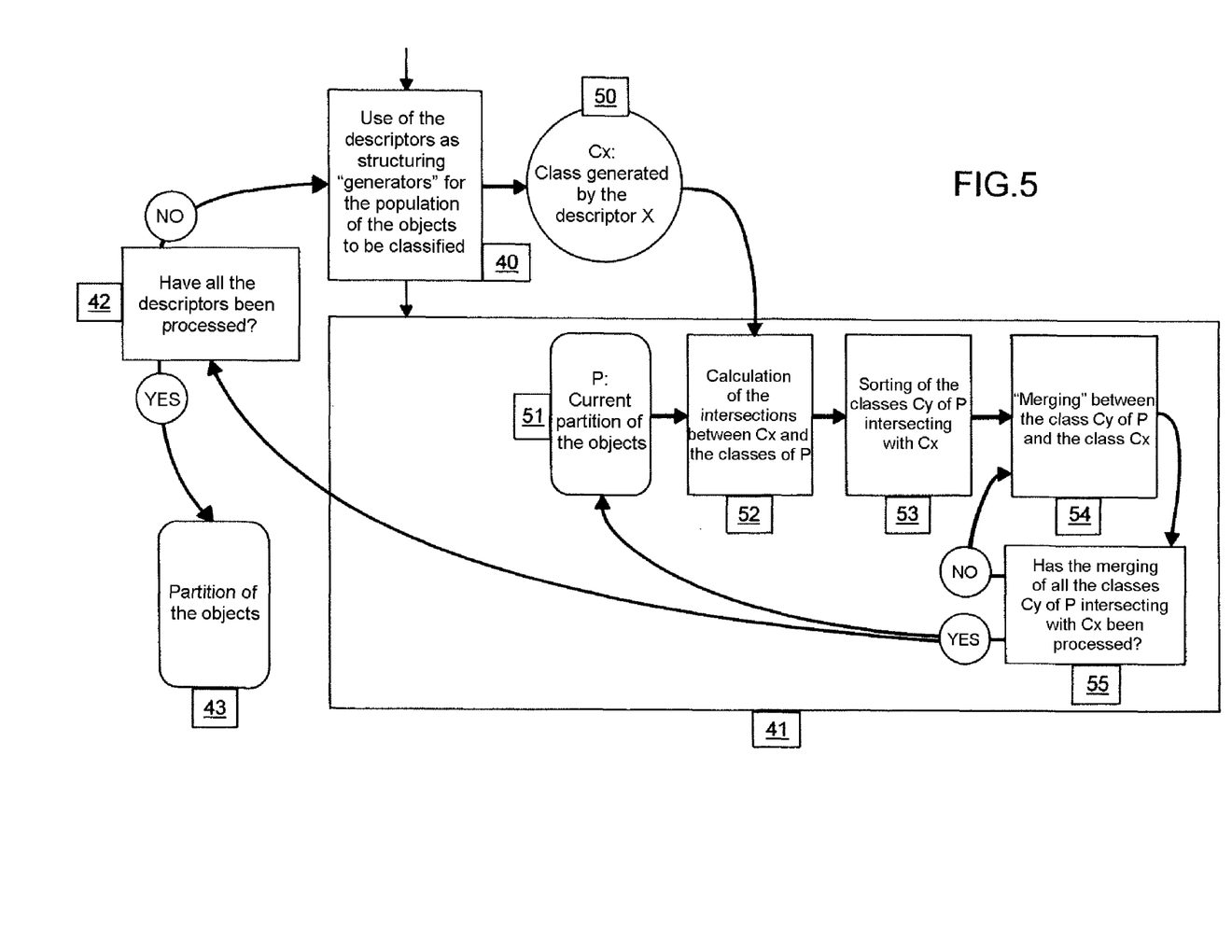

FIG. 5 shows an exemplary block flow diagram of the processing operation 41. This notably consists in "merging" a new class generated by a descriptor X denoted $C_x$, 50, with the current partition P composed of κ classes 51. The process is as follows:

Calculate of the intersections between the classes of the partition P and the class $C_x$, 52,
    Sort the set Λ of the classes $C_y$ of the partition P intersecting with the class $C_x$ into decreasing order of the cardinal of their intersection, 53, for example,
    For each class $C_y$, 55, of the set Λ, merge the two classes $C_y$ and $C_x$, 54.

All the intersections between $C_x$ and P are processed and once all the classes $C_y$ of Λ have been merged with $C_x$, 55, a new partition of the objects is obtained which improves the global criterion and which then becomes the new current partition 51. The next step consists in going to a new descriptor, 42, and this process is repeated until all the descriptors have been processed.

The cardinal of the elements of the set of the intersections of a class $C_x$ with the classes of a partition P, 52, can be obtained linearly in the manner described hereinafter.

The class $C_x$ is considered as the class whose intersection with a partition P it is desired to evaluate. With this class is associated a list sorted, for example, by increasing order of the indices of the objects that it contains. For this purpose, each object is identified by a single integer which is its index. In order to sort the objects, a linear sorting process is for example used (for example, sorting by base for which one reference is the following: Cormen et al (2002), Introduction to algorithmics, Dunod) since the upper bound of the values to be sorted is known.

The operation for calculating the cardinal of the intersections uses a vector $\vec{A}$ of dimension n for which each dimension i represents the index of the class where the individual $O_i$ is stored.

Example of Calculation of Intersection Cardinals:

If a population of 6 objects $O_1, O_2, \ldots, O_6$ and a current partition of these objects P, 51, composed of three classes $C_1=\{O_1,O_3\}, C_2=\{O_2, O_4, O_6\}, C_3=\{O_5\}$ is taken The vector $\vec{A}$ is equal to:

| $O_1$ | $O_2$ | $O_3$ | $O_4$ | $O_5$ | $O_6$ |
|---|---|---|---|---|---|
| 1 | 2 | 1 | 2 | 3 | 2 |

Thus, if the existing partition is "merged" with a class $C_x=\{O_2, O_3, O_4, O_6\}$ 50, the cardinal can be quickly determined of the set intersection of the class $C_x$ with the classes of the existing partition, in the present case $\text{Card}(\text{Inter}(C_1,C_x))=1$, $\text{Card}(\text{Inter}(C_2,C_x))=3$ and $\text{Card}(\text{Inter}(C_3,C_x))=0$.

The number of operations carried out during the calculation of the intersections 52 is equal to the number of objects in the class $C_x$ to be merged with the partition P. Indeed, for each object of the new class, it is verified whether it belongs to a class of the partition P; if it does, the intersection counter for this class is incremented.

If there are several intersections between a class $C_x$ and a partition P, as indicated hereinbelow, the cardinal of the various intersections between $C_x$ and the various classes $C_y$ of the partition P are calculated in order to obtain an order for them to be taken into account.

Based on the intersection of $C_x$ and of one class $C_y$ of the partition P, it is assessed which is the best configuration from amongst those present in FIG. 6. For this purpose, the quantities identified in FIG. 7 are evaluated. FIGS. 6 and 7 therefore explain an example of basic operations of the invention which are represented by the processing step 54.

The Process of "Merging" of Two Classes is for Example as Follows.

Let $\vec{R}^x$ and $\vec{R}^y$ be the representative vectors of the classes $C_x$ and $C_y$, the vectors $\vec{R}^a$, $\vec{R}^b$ and $\vec{R}^c$ are constructed that are defined by:

$$\vec{R}^a = \vec{R}^y - \vec{R}^c$$

$$\vec{R}^b = \vec{R}^x - \vec{R}^c$$

where $C_c = C_x \cap C_y$ is the class defined by the intersection of $C_x$ and $C_y$ (the objects in both the classes $C_x$ and $C_y$) and $\vec{R}^c$ its representative.

Hence, $\vec{R}^a$ represents the objects which are only in $C_y$ and $\vec{R}^b$ those which are only in $C_x$.

CardA, CardB and CardC will be respectively defined as the cardinals of the classes represented by $\vec{R}^a$, $\vec{R}^b$ and $\vec{R}^c$.

The two lists of objects contained in the classes $C_y$ and $C_x$ are sorted by increasing order of their index. The following conventional procedure can therefore be applied in order to quickly calculate the three vectors:

```
Procedure for Vector calculation (Class Cₓ, Class Cᵧ)
  R⃗ᵃ = R⃗ʸ
  R⃗ᵇ = R⃗ˣ
  R⃗ᶜ = 0
  CardA = CardB = CardC = 0
  L₁ = list of the objects of Cᵧ
  e = head of the list L₁
  L₂ = list of the objects of Cₓ
  f = head of the list L₂
  While the list L₁ has not ended, Do
    While the list L₂ has not ended, Do
      If e = f, Do
        R⃗ᵉ = O⃗ₑ
          R⃗ᵃ = R⃗ᵃ − R⃗ᵉ
          R⃗ᵇ = R⃗ᵇ − R⃗ᵉ
          R⃗ᶜ = R⃗ᶜ + R⃗ᵉ
        e = head of the list L₁
        f = head of the list L₂
        cardC = cardC + 1
      Else If e < f, Do
        e = head of the list L₁
        cardA = cardA + 1
      Else
        f = head of the list L₂
        cardB = cardB + 1
      End If
    End While
  End While
```

Based on these three vectors, it is possible to choose the best solution from amongst the following four, these being shown in an example in FIG. 6:

"break" the class $C_y$ in order to deliver the two following classes: $C_y - C_x$ and $C_x$ "break" the class $C_x$ in order to deliver the two following classes: $C_x - C_y$ and $C_y$ a "break" the class $C_x$ and "break" the class $C_y$, in order to deliver the three following classes: $C_x - C_y$, $C_y - C_x$ and $C_y \cap C_x$ a merge the two classes in order to deliver a single class: $C_y \cup C_x$.

The choice of the best of the four solutions is, for example, based on the evaluation of the "links" between the 3 different sub-classes presented hereinabove. The general calculation of the "link" between two classes $C_q$ and $C_{q'}$ is given by the following formula:

$$\text{Link}(C_q, C_{q'}) = \sum_{i \in C_q} \sum_{i' \in C_{q'}} \text{Contrib}_{ii'}$$

$$= \sum_{i \in C_q} \sum_{i' \in C_{q'}} (C_{ii'} - \alpha \times f(C_{ii}, C_{i'i'}))$$

When the measure of similarity is a scalar product, and when $f(C_{ii}, C_{i'i'}) = \text{Min}(C_{ii}, C_{i'i'})$, as previously, the calculation of the link between two different classes can be linearized. The method uses, for this purpose, the linearity properties of the scalar product, which yields the following simplification:

$$\text{Link}(C_q, C_{q'}) = <\vec{R}^q, \vec{R}^{q'}> -\alpha \times \sum_{i \in C_q} \sum_{i' \in C_{q'}} \text{Min}(C_{ii}, C_{i'i'})$$

The following procedure may also be used which allows the quantity $$\sum_{i \in C_q} \sum_{i' \in C_{q'}} \text{Min}(C_{ii}, C_{i'i'})$$

to be evaluated with a linear complexity:

```
Procedure MinCC' (Class C, Class C')
    Requires: CardC > 0
    Requires: CardC'> 0
    Requires: Sorted list of individuals for the classes C and C'
    Integer: résultat = 0
    Integer: nb_rows = CardC
    Integer: nb_cols = CardC'
    Integer: j = next element of C
    Integer: j' = next element of C'
    While the class C has not ended and the class C' has not ended, Do
        If j < j' do
            result = result + nb_cols × C_jj
            j = next element of C
            nb_rows = nb_rows − 1
        Else
            If j'< j do
                result = result + nb_rows × C_j'j'
                j' = next element of C'
                nb_cols = nb_cols − 1
            Else
                result = result + (nb_cols + nb_rows − 1) × C_jj'
                j = next element of C
                j' = next element of C'
                nb_rows = nb_rows − 1
                nb_cols = nb_cols − 1
            End If
        End If
    End While
```

With regard to the intersection between two classes, the method evaluates the following three quantities which are shown in an example in FIG. 7:

$$\text{Link}_1 = \text{Link}(C_y - C_c, C_x - C_c)$$
$$= <\vec{R}^a, \vec{R}^b> -\alpha \times \sum_{i \in C_y \cap i \notin C_c} \sum_{i' \in C_x \cap i' \notin C_c} f(C_{ii}, C_{i'i'})$$

$$\text{Link}_2 = \text{Link}(C_y - C_c, C_c)$$
$$= <\vec{R}^a, \vec{R}^c> -\alpha \times \sum_{i \in C_y \cap i \notin C_c} \sum_{i' \in C_c} f(C_{ii}, C_{i'i'})$$

-continued $$\text{Link}_3 = \text{Link}(C_x - C_c, C_c)$$
$$= <\vec{R}^b, \vec{R}^c> -\alpha \times \sum_{i \in C_x \cap i \notin C_c} \sum_{i' \in C_c} f(C_{ii}, C_{i'i'})$$

Thus, in order to maximize locally the global criterion:
If $\text{Link}_1 + \text{Link}_2 + \text{Link}_3$ is the largest, the solution 4 (merging of the two classes) is chosen:
If $\text{Link}_2$ is the largest, the solution 2 ("breaking" of $C_x$) is chosen:
If $\text{Link}_3$ is the largest, the solution 1 ("breaking" of $C_y$) is chosen:
If 0 is the largest, in other words if $\text{Link}_1 + \text{Link}_2 + \text{Link}_3 < 0$, $\text{Link}_2 < 0$ and $\text{Link}_3 < 0$, then the solution 3 ("breaking" of $C_x$ and of $C_y$) is chosen.

Once the class $C_x$, 50, has been merged with the first class $C_y$, the other classes of the partition P intersecting with the class $C_x$ continue to be processed, 55. For this purpose, the class $C_x$ will be transformed into class $C_{x'}$:
If the solution 1 is chosen, $C_{x'} = C_x$
If the solution 2 is chosen, $C_{x'} = C_x - C_y$
If the solution 3 is chosen, $C_{x'} = C_x - C_y$
If the solution 4 is chosen, $C_{x'} = C_x \cup C_y$ In any case, the new class $C_{x'}$ contains the objects which can belong to the other classes of the partition P since it is known, in advance, that no object of the class $C_y$ can belong to another class of the partition P.

Procedure for Removing Objects from a Class

In order to remove a set of objects $\Delta$ from a class, it suffices to remove $\Delta$ from the list of objects of the class and to deduct the representative $\vec{R}^\Delta$ from the representative of said class. For example, during the operation $C_{x'} = C_x - C_y$, $\vec{R}^\Delta$ is equal to $\vec{R}^c$. In effect, the intersecting objects represented by the representative $\vec{R}^c$ are subtracted from the class $C_x$. Thus, $\vec{R}^{x'} = \vec{R}^x - \vec{R}^c$.

In this way, the "breaking" operations do not require a significant calculation time since the quantity deducted from the representative of the class is always equal to the vector $\vec{R}^c$ which has already been calculated. Moreover, the removal of the objects from the list is a simple and linear operation.

Procedure for Combining Two Classes

In this procedure, the representative of the intersection of $C_1$ and $C_2$ (defined by $\vec{R}^c$ hereinabove) and the cardinal of the intersection (defined by CardC hereinabove) are known. The idea is therefore to create the class $C_1 \cup C_2$, without carrying out a complete linear sorting procedure.

```
Procedure Combination (Class C_1, Class C_2, Representative Inter, Integer
CardInter)
Temporary vector of size (CardC_1 + CardC_2 − CardInter)
Integer position = 0
L_1 = list of the objects of C_1
e = head of the list L_1
L_2 = list of the objects of C_2
f = head of the list L_2
While the list L_1 has not ended, Do
    While the list L_2 has not ended, Do
        If e = f, Do
            el = e
            e = head of the list L_1
            f = head of the list L_2
        Else If e < f Da
            el = e
            e = head of the list L_1
```

-continued

```
        Else
          el = f
          f = head of the list L₂
        End If
        Temporary[position] = el
        Position = position + 1
      End While
  End While
  Copy Temporary into the list of the objects
  Representative = Representative (C₁) + Representative (C₂) – Inter
```

Procedure Regroup (Partition P) 44
Let $\kappa$ be the number of classes of the partition P
For each class $C_q$ of the partition P, Contrib($C_q$) is calculated
Let $C_x$ be the class that possesses the strongest contribution
The vector $\vec{S}$ of $\kappa-1$ values is calculated, defined by:

$$\vec{S} = (s_1, s_2, \ldots, s_{K-1})$$

and where $$s_l = \begin{Bmatrix} \text{Link}(C_x, C_l) \text{ if } l < x \\ \text{Link}(C_x, C_{l+1}) \text{ if } l > x \end{Bmatrix}$$

For all the positive values of Link in $\vec{S}$, the corresponding classes will be merged. The set of these classes will be marked as being assigned and will no longer thereafter be able to be merged. The process is re-iterated with the set $\kappa'$ of the unmarked classes.

Process of the Invention for Hierarchical Aggregation of the Classes

In FIG. 8, an example is shown of architecture for the method of hierarchical aggregation of the classes into meta-classes.

This process consists, notably, in regrouping the classes amongst themselves over several levels (the number of levels is to be fixed by the user). The optimization of the global criterion involves, for example, the maximization of the links between the classes formed. In other words, the classes obtained must, in the end, have negative links. However, the calculation of the links is based on the definition of the contribution Contrib$_{ii'}$ of a pair (i,i') of objects. Hereinbelow, the definition of the contribution of a pair of objects is recalled when the function $f$ is the function Minimum:

$$\text{Contrib}_{ii'} = C_{ii'} - \alpha \times \text{Min}(C_{ii}, C_{i'i'})$$

The process of aggregation of the classes, proposed by the invention, then consists in decreasing at each level, the value of the structural threshold 80, such that the weakly negative contributions can become positive. In this way, the link between two classes can become positive which allows them to be regrouped 81, and relationships between the classes of a partition to be highlighted. This process is repeated as many times as there are levels 82. A set of nested partitions 83 is then obtained, which allows hierarchical and conceptual relationships (over several levels) to be detected between the classes initially considered within the partition 45. By this principle, the invention thus enables knowledge discovery to be achieved.

The procedure for hierarchical aggregation of the classes of a level j at a level j+1 is similar to the procedure Regroup described hereinabove.

Calculations Allowing the Quality of the Classification Results of the Invention to be Evaluated The theoretical formulae for the indices measuring the quality of the solution obtained which is expressed as a percentage are given here. The closer the index is to 100%, the higher is the quality of the solution studied (qualities of partition, class or individual).
Some notation is firstly introduced:
The agreement between two classes:

$$A_{CC'} = \sum_{i \in C} \sum_{i' \in C'} C_{ii'}$$

The maximum agreement between two classes:

$$AM_{CC'} = \sum_{i \in C} \sum_{i' \in C'} f(C_{ii}, C_{i'i'})$$

The disagreement between two classes: $\overline{A}_{CC'} = AM_{CC'} - A_{CC'}$
The final quality of the partition obtained is given by:

$$Q = \frac{\sum_{C=1}^{K} A_{CC} + \sum_{C=1}^{K} \sum_{C' \neq C} \overline{A}_{CC'}}{\sum_{C=1}^{K} \sum_{C'=1}^{K} AM_{CC'}}$$

$$= \frac{\sum_{C=1}^{K} A_{CC} - \sum_{C=1}^{K} \sum_{C' \neq C} A_{CC'} + \sum_{C=1}^{K} \sum_{C' \neq C} AM_{CC'}}{\sum_{C=1}^{K} \sum_{C'=1}^{K} AM_{CC'}}$$

where $\kappa$ is the number of classes of the partition.
The quality of a class C is given by:

$$Q_C = \frac{A_{CC} + 2 \times \sum_{C' \neq C} \overline{A}_{CC'}}{AM_{CC} + 2 \times \sum_{C' \neq C}^{NbCl} AM_{CC'}}$$

$$= \frac{A_{CC} - 2 \times \sum_{C' \neq C} A_{CC'} + 2 \times \sum_{C' \neq C} AM_{CC'}}{AM_{CC} + 2 \times \sum_{C' \neq C}^{NbCl} AM_{CC'}}$$

The quality of an object i belonging to a class C is given by:

$$Q_i = \frac{\sum_{i' \in C} C_{ii'} + \sum_{i' \notin C} \overline{C}_{ii'}}{\sum_{i'=1}^{n} f(C_{ii}, C_{i'i'})}$$

$$= \frac{\sum_{i' \in C} C_{ii'} - \sum_{i' \notin C} C_{ii'} + \sum_{i' \notin C} f(C_{ii}, C_{i'i'})}{\sum_{i'=1}^{n} f(C_{ii}, C_{i'i'})}$$

where $\overline{C}_{ii'} = f(C_{ii}, C_{i'i'}) - C_{ii'}$ is the disagreement between the individual i and the individual i'.
The sums over the terms $A_{CC'}$ are linearizable when the similarities $C_{ii'}$ are scalar products thanks to the linearity properties of the latter. Examples are given hereinbelow of procedures allowing the following quantities involved in the various quality formulae to be linearly calculated when $\oplus(C_{ii}, C_{i'i'}) = \text{Min}(C_{ii}, C_{i'i'})$:

$$\sum_C \sum_{C'} AM_{CC'} = \sum_C \sum_{C'} \left( \sum_{i \in C} \sum_{i' \in C'} \text{Min}(C_{ii}, C_{i'i'}) \right)$$

$$\sum_{C'} AM_{CC'} = \sum_{C'} \left( \sum_{i \in C} \sum_{i' \in C'} \text{Min}(C_{ii}, C_{i'i'}) \right)$$

$$\sum_{i' \in C} \text{Min}(C_{ii}, C_{i'i'})$$

These quantities are respectively denoted SS'MinCC', S'MinC' and MiniC:

```
*************************************************************
Procedure SS'MinCC' (Class C, Class C')
    Requires: κ > 0
    Integer: result = 0
    For i = 1 to n in increments of 1, Do
        result = result + ((n − i + 1) × 2 − 1) × C_ii
    End For
*************************************************************
*************************************************************
Procedure S'MinCC' (Class C, Class C')
    Requires: CardC > 0
    Requires: κ > 0
    Requires: Sorted list of individuals for the classes C
    Integer: result = 0
    Integer: nb_rows = CardC
    Integer: nb_cols = n
    Integer: j = next element of C
    Integer: i = 1
    While the class i ≤ n and C has not ended, Do
        If i = j do
            result = result + (nb_cols + nb_rows − 1) × C_ii
            nb_rows = nb_rows − 1
            nb_cols = nb_cols − 1
            i = i + 1
            j = next element of C'
        Else
            result = result + nb_rows × C_ii
            i = i + 1
            nb_cols = nb_cols − 1
        End If
    End While
*************************************************************
*************************************************************
Procedure MiniC (Class C)
    Requires: CardC > 0
    Requires: List triee of individuls pour the class C
    Integer: result = 0
    Integer: nb_cols = CardC
    Integer: j = next element of C
    While the class C has not ended and nb_cols ≤ j, Do
        If i = j, Do
            result = result + nb_cols × C_ii
        Else
            result = result + C_jj
            j = next element of C
            nb_cols = nb_cols − 1
        End If
    End While
*************************************************************
```

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A processor-implemented method of linear unsupervised classification allowing a database composed of objects and of descriptors to be structured, which is stable on the order of the objects, comprising:
   an initial step for transformation of the qualitative, quantitative or textual data into presence-absence binary data, wherein said processor-implemented method further comprises the following steps:
   determining a structural threshold $\alpha_s$ function of the $n^2$ agreements between the objects to be classified, the structural threshold defining an optimization criterion adapted to the data,
   using the descriptors as structuring and construction generators of a partition or set of classes, regrouping of the classes of a partition over several hierarchical levels, said regrouping including the following steps:
   decreasing at each level the value of the structural threshold in such a manner that the negative contributions become positive,
   maximizing links between the classes formed where the links are determined by using the contribution from a pair of objects $$\text{Lien}(C_q, C_{q'}) = \sum_{i \in C_q} \sum_{i' \in C_{q'}} \text{Contrib}_{ii'}$$

$$= \sum_{i \in C_q} \sum_{i' \in C_{q'}} C_{ii'} - \alpha' \times f(C_{ii}, C_{i'i'})$$

with α' the new value of α,
   combining two classes whose link is positive, and reiterate this process over all the levels,
   progressively merging a class generated by a descriptor and a partition, and
   for an optimization criterion involving a function $f(C_{ii}, C_{i'i'}) = \text{Min}(C_{ii}, C_{i'i'})$, linearizing sums of Minimum functions.

2. The method as claimed in claim 1, wherein said step of regrouping the classes of the partition is carried out amongst themselves.

3. The method as claimed in claim 1, wherein the step of merging comprises a step, based on two intersecting classes, determining a best operation (in terms of the optimization of the criterion) from the following:
   breaking of the first class and formation of two classes;
   breaking of the second class and formation of two classes;
   breaking of the two classes in order to form three classes; and
   joining of the two intersecting classes in order to form one single class.

4. A device allowing linear unsupervised classification that allows a database composed of objects and of descriptors to be structured, which is stable on the order of the objects, comprising an initial step for transformation of the qualitative, quantitative or textual data into presence-absence binary data, said device comprising at least the following elements:
   a computer comprising a memory, a database and a processor adapted to implement the following steps:
   an initial step for transformation of the qualitative, quantitative or textual data into presence-absence binary data, wherein said processor-implemented method further comprises the following steps:
   determining a structural threshold $\alpha_s$ function of the $n^2$ agreements between the objects to be classified, the structural threshold defining an optimization criterion adapted to the data, using the descriptors as structuring and construction generators of a partition or set of classes, regrouping of the classes of a partition over several hierarchical levels, said regrouping including the following steps:
  decreasing at each level the value of the structural threshold in such a manner that the negative contributions become positive,
  maximizing links between the classes formed where the links are determined by using the contribution from a pair of objects $$\text{Lien}(C_q, C_{q'}) = \sum_{i \in Cq} \sum_{i' \in Cq'} \text{Contrib}_{ii'}$$

$$= \sum_{i \in Cq} \sum_{i' \in Cq'} C_{ii'} - \alpha' \times f(C_{ii}, C_{i'i'})$$

with $\alpha'$ the new value of $\alpha$,
combining two classes whose link is positive, and reiterate this process over all the levels,
progressively merging a class generated by a descriptor and a partition, and
for an optimization criterion involving a function $f(C_{ii}, C_{i'i'})=\text{Min}(C_{ii},C_{i'i'})$, linearizing sums of Minimum functions.

5. The device as claimed in claim 4, comprising a means for undertaking actions depending on the results of the classification.

6. A device allowing linear unsupervised classification that allows a database composed of object and of descriptors to be structured, which is stable on the order of the objects, comprising an initial step for transformation of the qualitative, quantitative or textual data into presence-absence binary data, said device comprising at least the following elements: a computer comprising a memory, a database and a processor adapted to implement the following steps:
  an initial step for transformation of the qualitative, quantitative or textual data into presence-absence binary data, wherein said processor-implemented method further comprises the following steps:
  determining a structural threshold $\alpha_s$ function of the $n^2$ agreements between the objects to be classified, the structural threshold defining an optimization criterion adapted to the data,
  using the descriptors as structuring and construction generators of a partition or set of classes, regrouping of the classes of a partition over several hierarchical levels, said regrouping including the following steps:
    decreasing at each level the value of the structural threshold in such a manner that the negative contributions become positive,
    maximizing links between the classes formed where the links are determined by using the contribution from a pair of objects $$\text{Lien}(C_q, C_{q'}) = \sum_{i \in Cq} \sum_{i' \in Cq'} \text{Contrib}_{ii'}$$

$$= \sum_{i \in Cq} \sum_{i' \in Cq'} C_{ii'} - \alpha' \times f(C_{ii}, C_{i'i'})$$

with $\alpha'$ the new value of $\alpha$,
combining two classes whose link is positive, and reiterate this process over all the levels,
progressively merging a class generated by a descriptor and a partition, and
for an optimization criterion involving a function $f(C_{ii}, C_{i'i'})=\text{Min}(C_{ii},C_{i'i'})$, linearizing sums of Minimum functions,
wherein said step of regrouping the classes of the partition is carried out amongst themselves.

7. A device allowing linear unsupervised classification that allows a database composed of objects and of descriptors to be structured, which is stable on the order of the objects, comprising an initial step for transformation of the qualitative, quantitative or textual data into presence-absence binary data, said device comprising at least the following elements: a computer comprising a memory, a database and a processor adapted to implement the following steps:
  an initial step for transformation of the qualitative, quantitative or textual data into presence-absence binary data, wherein said processor-implemented method further comprises the following steps:
  determining a structural threshold $\alpha_s$ function of the $n^2$ agreements between the objects to be classified, the structural threshold defining an optimization criterion adapted to the data,
  using the descriptors as structuring and construction generators of a partition or set of classes, regrouping of the classes of a partition over several hierarchical levels, said regrouping including the following steps:
    decreasing at each level the value of the structural threshold in such a manner that the negative contributions become positive,
    maximizing links between the classes formed where the links are determined by using the contribution from a pair of objects $$\text{Lien}(C_q, C_{q'}) = \sum_{i \in Cq} \sum_{i' \in Cq'} \text{Contrib}_{ii'}$$

$$= \sum_{i \in Cq} \sum_{i' \in Cq'} C_{ii'} - \alpha' \times f(C_{ii}, C_{i'i'})$$

with $\alpha'$ the new value of $\alpha$,
combining two classes whose link is positive, and reiterate this process over all the levels,
progressively merging a class generated by a descriptor and a partition, and for an optimization criterion involving a function $f(C_{ii},C_{i'i'})=\text{Min}(C_{ii},C_{i'i'})$, linearizing sums of Minimum functions,
wherein the step of merging comprises a step, based on two intersecting classes, determining a best operation (in terms of the optimization of the criterion) from the following:
breaking of the first class and formation of two classes;
breaking of the second class and formation of two classes;
breaking of the two classes in order to form three classes; and
joining of the two intersecting classes in order to form one single class.

* * * * *